(12) United States Patent
Alessio et al.

(10) Patent No.: US 12,455,064 B2
(45) Date of Patent: Oct. 28, 2025

(54) LIGHTING DEVICE WITH SELECTIVELY ADJUSTABLE ILLUMINATED HEIGHT/WIDTH RATIO

(71) Applicant: Cerno, LLC, Aliso Viejo, CA (US)

(72) Inventors: David Alessio, Aliso Viejo, CA (US); Daniel Wacholder, Aliso Viejo, CA (US); Nick Sheridan, Aliso Viejo, CA (US)

(73) Assignee: Cerno, LLC, Aliso Viejo, CA (US)

( * ) Notice: Subject to any disclaimer, the term of this patent is extended or adjusted under 35 U.S.C. 154(b) by 189 days.

(21) Appl. No.: 18/318,458

(22) Filed: May 16, 2023

(65) Prior Publication Data
US 2024/0384860 A1  Nov. 21, 2024

(51) Int. Cl.
*F21V 17/00* (2006.01)
*F21V 11/18* (2006.01)
*F21V 21/03* (2006.01)
*F21V 21/30* (2006.01)

(52) U.S. Cl.
CPC .......... *F21V 17/002* (2013.01); *F21V 11/183* (2013.01); *F21V 21/03* (2013.01); *F21V 21/30* (2013.01)

(58) Field of Classification Search
CPC ........ F21V 17/002; F21V 21/03; F21V 21/30; F21V 11/183; F21S 8/04
USPC ....... 362/232, 238, 239, 248, 287, 371, 404, 362/409, 427, 428
See application file for complete search history.

(56) References Cited

U.S. PATENT DOCUMENTS

| | | | |
|---|---|---|---|
| 3,492,474 A | | 1/1970 | Yamaguchi et al. |
| 3,974,371 A | * | 8/1976 | Miles, Jr. ................ F21S 8/02 |
| | | | 362/372 |
| 4,310,875 A | * | 1/1982 | Price ...................... F21V 21/30 |
| | | | 362/427 |
| 4,689,547 A | | 8/1987 | Rowen et al. |
| 4,716,344 A | | 12/1987 | Newell et al. |
| 4,727,296 A | | 2/1988 | Zaharchuk et al. |
| 4,745,351 A | | 5/1988 | Rowen et al. |

(Continued)

FOREIGN PATENT DOCUMENTS

| | | |
|---|---|---|
| JP | 2005243522 A | 9/2005 |
| JP | 2006324134 A | 11/2006 |

(Continued)

*Primary Examiner* — Thomas M Sember
(74) *Attorney, Agent, or Firm* — Stetina Garred Brucker & Newboles

(57) ABSTRACT

A lighting device includes a base configured to be attachable to a support structure. A light housing is coupled to the base and is configured to be engageable with a light source to illuminate a light beam along an illumination axis. The light housing is attached to the base in a manner which allows the light housing to be moveable relative to the base. A beam modifying device is configured to be selectively attachable to the light housing in optical alignment with the light source. The light housing is configured such that movement of the light housing relative to the base facilitates adjustment of the position of an illuminated area. The beam modifying device is configured such that attachment of the beam modifying device to the light housing facilitates adjustment of the size of the illuminated area.

20 Claims, 9 Drawing Sheets

(56) References Cited

U.S. PATENT DOCUMENTS

| | | | |
|---|---|---|---|
| 4,788,628 A * | 11/1988 | Farrall | G03B 15/02 |
| | | | 362/310 |
| 4,792,731 A | 12/1988 | Pearlman et al. | |
| 5,072,216 A | 12/1991 | Grange | |
| 5,491,463 A | 2/1996 | Sargeant et al. | |
| 5,526,245 A | 6/1996 | Davis et al. | |
| 5,903,226 A | 5/1999 | Suman et al. | |
| 6,170,967 B1 | 1/2001 | Usher et al. | |
| 6,175,201 B1 | 1/2001 | Sid | |
| 6,331,813 B1 | 12/2001 | Belliveau | |
| 6,369,524 B2 | 4/2002 | Sid | |
| 7,070,293 B2 | 7/2006 | Seymour | |
| 7,553,051 B2 | 6/2009 | Brass et al. | |
| 9,134,004 B2 | 9/2015 | Wacholder et al. | |
| 2003/0002285 A1 | 1/2003 | Paravantsos | |
| 2006/0018112 A1 | 1/2006 | Seymour | |
| 2006/0023465 A1 | 2/2006 | Ohshio et al. | |
| 2007/0076412 A1 | 4/2007 | Harbers et al. | |
| 2009/0129072 A1 | 5/2009 | Oza | |
| 2009/0168422 A1 | 7/2009 | Chiu et al. | |
| 2009/0290344 A1 | 11/2009 | Chiang et al. | |
| 2010/0079059 A1 | 4/2010 | Roberts et al. | |
| 2010/0238658 A1 | 9/2010 | Xiang et al. | |
| 2012/0275167 A1 | 11/2012 | Scruggs et al. | |
| 2015/0285464 A1 * | 10/2015 | Finn | F21S 8/043 |
| | | | 362/232 |

FOREIGN PATENT DOCUMENTS

| | | |
|---|---|---|
| KR | 100880429 B1 | 1/2009 |
| KR | 101109142 B1 | 1/2012 |

\* cited by examiner

LIGHTING DEVICE WITH SELECTIVELY ADJUSTABLE ILLUMINATED HEIGHT/WIDTH RATIO

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to a lighting system, and more specifically to a lighting system configured to facilitate selective adjustment of a height and width of an illuminated area to enable one to conform the size of the illuminated area to a target object, such as a piece of art.

2. Description of the Related Art

Pieces of art, like paintings, pictures and sculptures, are commonly mounted on a wall for display. To optimize the display of the piece of art, light may be aimed or directed onto the art. It is common practice in the lighting industry to illuminate the piece of art using a single projector style lighting device. Given that different pieces of art come in different sizes, the light from a single lighting device may not conform to the size and shape of the target piece of art. In this regard, the illuminated area generated by the lighting device may be too small (e.g., it may not cover the entirety of the target piece of art), or alternatively, the illuminated area may be too large (e.g., the target surface may be overfilled with light). In the case of the illuminated area being too large, some lighting devices may include one or more baffles which may be used to trim down the size of the illuminated area to more closely conform with the size of the target piece of art.

Although the use of baffles may allow for some measure of size adjustment of the illuminated area, when deployed, the baffles block spill light, which may be associated with inefficiencies.

Accordingly, there is a need in the art for a lighting device that allows for selective variation in the size and position of an illuminated area to facilitate conforming the illuminated area to a target object. Various aspects of the present disclosure address this particular need, as will be discussed in more detail below.

BRIEF SUMMARY

Various aspects of the present disclosure relate to a highly adaptable and configurable lighting device for creating a lighted area to illuminate a target surface or structure, such as a piece of art on a wall. The lighting device may be configured to facilitate various aspects of light adjustment, such as adjusting the height of an illuminated area, the width of the illuminated area, the position of the illuminated area, as well as the brightness of the illuminated area. Thus, the various adjustment capabilities may allow the lighting device to generate a uniform illumination area over the target surface.

In accordance with one embodiment of the present disclosure, there is provided a lighting device comprising a base configured to be attachable to a base support structure. A first light housing is coupled to the base and is configured to be engageable with a first light source to illuminate a first light beam along a first illumination axis when the first light source is engaged with the first light housing and the first light source is actuated. The first light housing is attached to the base in a manner which allows the first light housing to be moveable relative to the base. The lighting device additionally includes a first beam modifying device configured to be selectively attachable to the first light housing in optical alignment with the first light source. The first light housing is configured such that movement of the first light housing relative to the base facilitates adjustment of the position of an illuminated area defined, at least in part, by the first light beam. The first beam modifying device is configured such that attachment of the first beam modifying device to the first light housing facilitates adjustment of the size of the illuminated area.

The first beam modifying device may be configured to facilitate adjustment of the size of the illuminated area along a beam modifying axis. The lighting device may additionally include a baffle coupled to the base, with the baffle being selectively positionable relative to the first light housing to selectively block a desired amount of the first light beam from passing beyond the baffle to facilitate adjustment of the size of the illuminated area along a baffle adjust axis different from the beam modifying axis. The baffle adjust axis may be perpendicular to the beam modifying axis. The baffle may be pivotally coupled to the base.

The first light housing may be pivotally coupled to the base. The first light housing may be configured to being engageable with multiple light elements defining the first light source. The first beam modifying device may include multiple beam modifying elements, with each beam modifying element being optically alignable with a respective one of the multiple light elements when the multiple light elements are engaged with the first light housing and the first beam modifying device is attached to the first light housing.

The lighting device may include a second light housing coupled to the base in spaced relation to the first light housing. The second light housing may be configured to be engageable with a second light source to illuminate a second light beam along a second illumination axis when the second light source is engaged with the second light housing and the second light source is actuated. The second light housing may be moveable relative to the base. The lighting device may also include a second beam modifying device selectively attachable to the second light housing in optical alignment with the second light source. The second beam modifying device may be configured such that attachment of the second beam modifying device to the second light housing facilitates adjustment of the size of the illuminated area.

The lighting device may also include a brightness adjuster in operative communication with the light housing and adapted to facilitate selective adjustment of a brightness of the light beam.

According to another embodiment, there is provided a lighting device including a base configured to be attachable to a base support structure. A light housing is coupled to the base and is configured to be engageable with a light source to illuminate a light beam along an illumination axis when the light source is engaged with the light housing and the light source is actuated, with the light housing being moveable relative to the base. The light housing is configured such that movement of the light housing relative to the base facilitates adjustment of the position of an illuminated area defined, at least in part, by the light beam. The lighting device additionally includes a light spread controller coupled to the light housing and configured to be in operative alignment with the light source, with the light spread controller being configured to facilitate adjustment of the size of the illuminated area.

The light spread controller may include a plurality of interconnected linkages operatively connected to transition between a narrow configuration and wide configuration, with the size of the illuminated area increasing as the light spread controller transitions from the narrow configuration toward the wide configuration.

The light spread controller may be configured to facilitate adjustment of the size of the illuminated area along a controller adjust axis. The lighting device may further include a baffle coupled to the base, with the baffle being selectively positionable relative to the light housing to selectively block a desired amount of the light beam from passing beyond the baffle to facilitate adjustment of the size of the illuminated area along a baffle adjust axis different from the controller adjust axis.

According to yet another embodiment, there is provided a method of adjusting a size of an illuminated area. The method includes adjusting a position of a light housing relative to a base to adjust an illumination axis along which a light beam emanates from the light housing, the light beam defining, at least in part, the illuminated area. The method also includes adjusting a beam width associated with the light beam emanating from the light housing, and adjusting a baffle coupled to the base to block at least a portion of the light beam emanating from the light housing.

The step of adjusting the position of the light housing may include pivoting the light hosing relative to the base.

The step of adjusting the beam width may include attaching a beam modifying device to the light housing.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of certain embodiments of a lighting device capable of selectively adjusting a size and position of an illuminated area and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Various aspects of the present disclosure pertain to a lighting device specifically configured and adapted to allow for selective adjustment of a size (e.g., height-to-width ratio) and position of an illuminated area. Such adjustability may be desirable for conforming the illuminated area to the size and position of a piece of art hanging on a wall. In this regard, the illuminated area may be tailored to the specific dimensions of the piece of art, and may not extend substantially beyond the outer periphery of the piece of art. Thus, the lighting device allows for efficient, yet aesthetic illumination of desired items.

Figure 1:
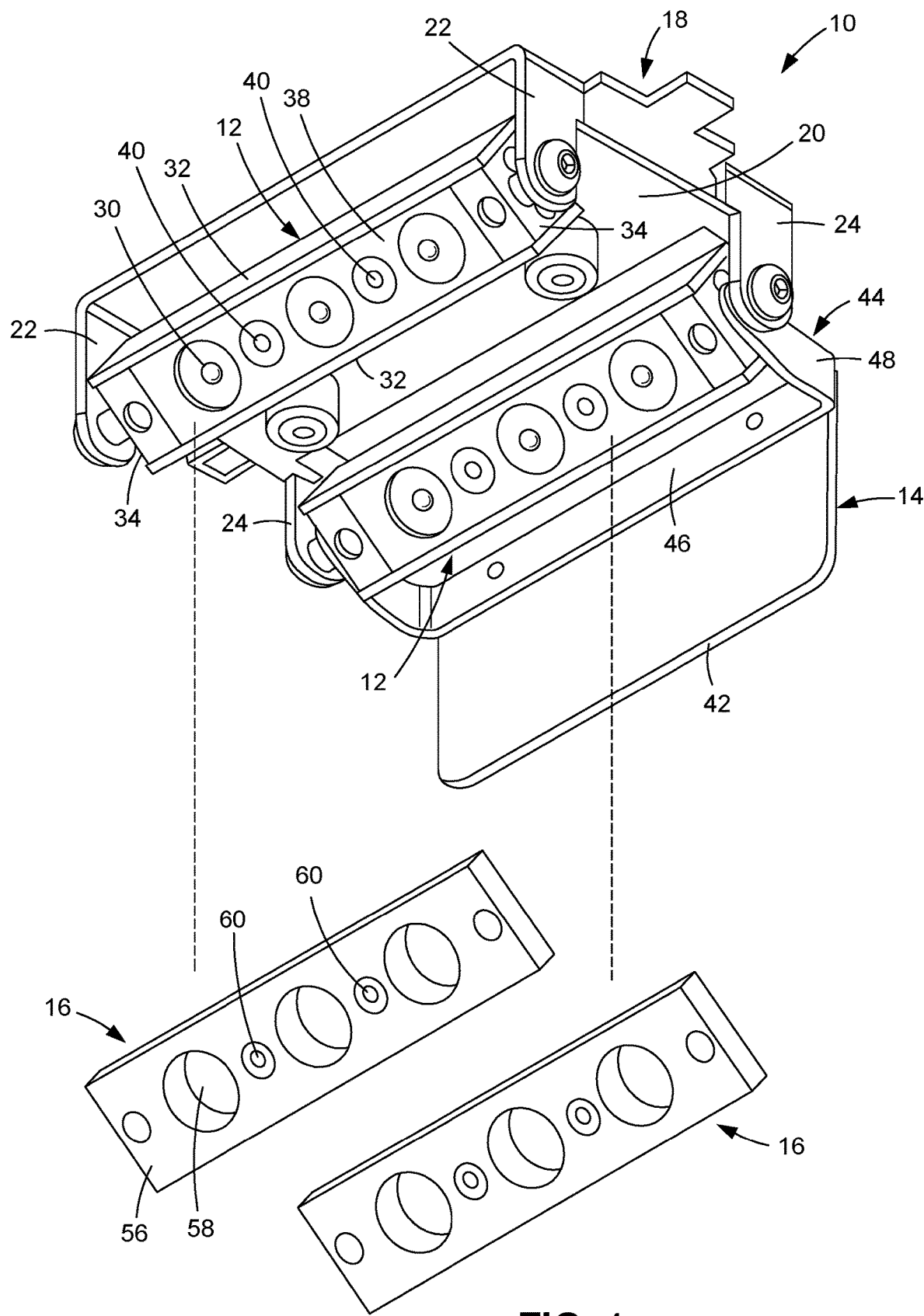
FIG. 1 is a lower perspective, partially exploded view of a first embodiment of a lighting device configured to adjust an illumination area of light emitted therefrom.
Figure 2:
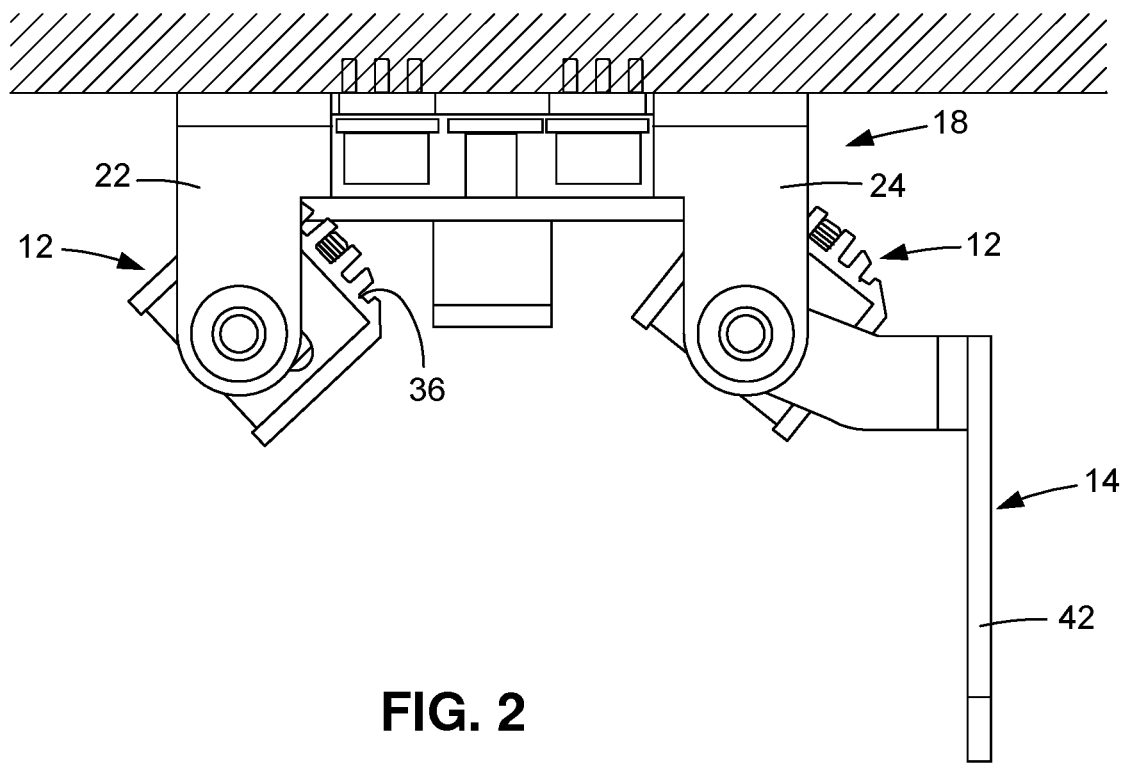
FIG. 2 is a side view of the lighting device mounted on a ceiling, with a pair of light housings being shown without beam modifying devices coupled thereto.
Figure 3:
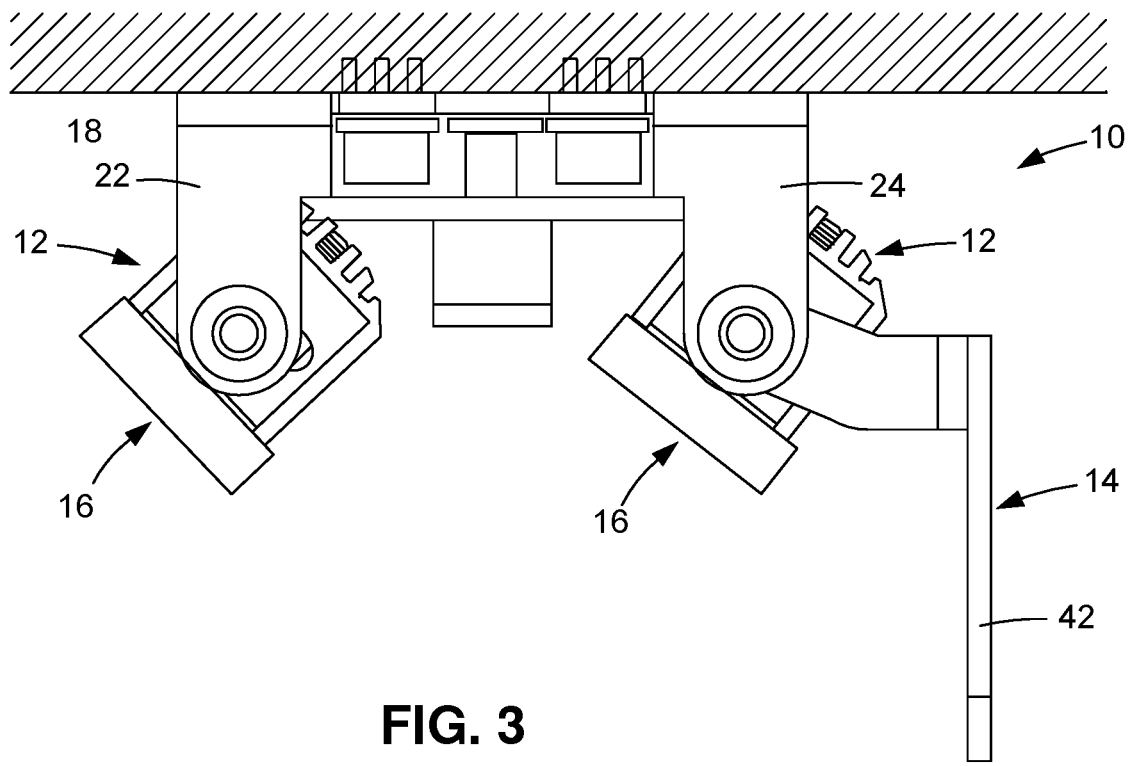
FIG. 3 is a side view of the lighting device mounted on a ceiling, with the pair of light housings being coupled to beam modifying devices.
Figure 4:
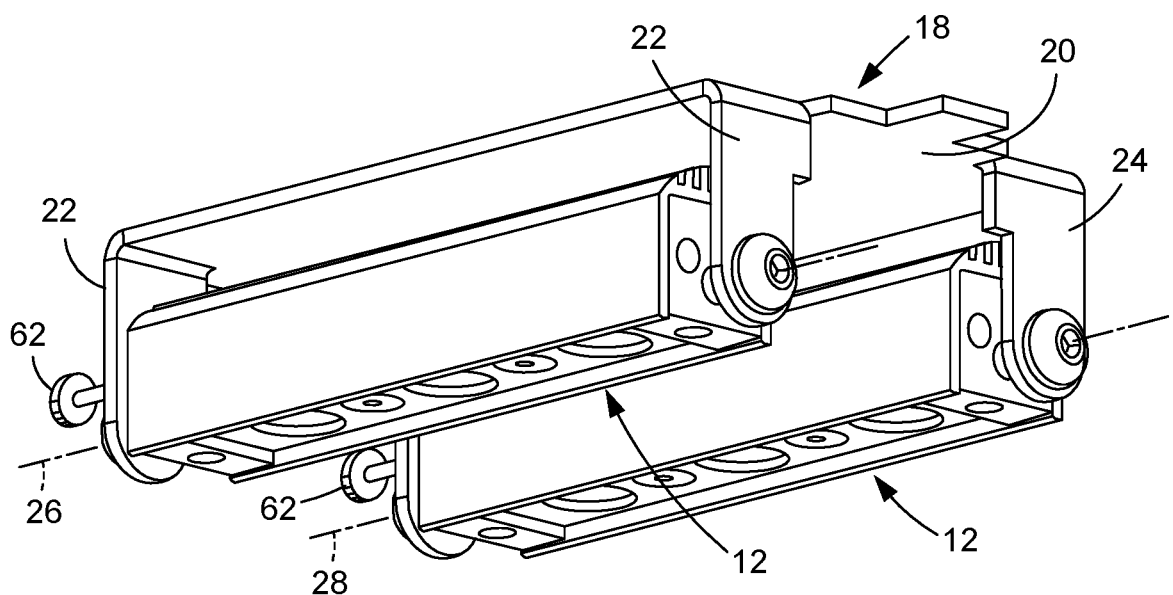
FIG. 4 is a lower perspective view of a base having a pair of light housings pivotally coupled thereto.
Figure 5:
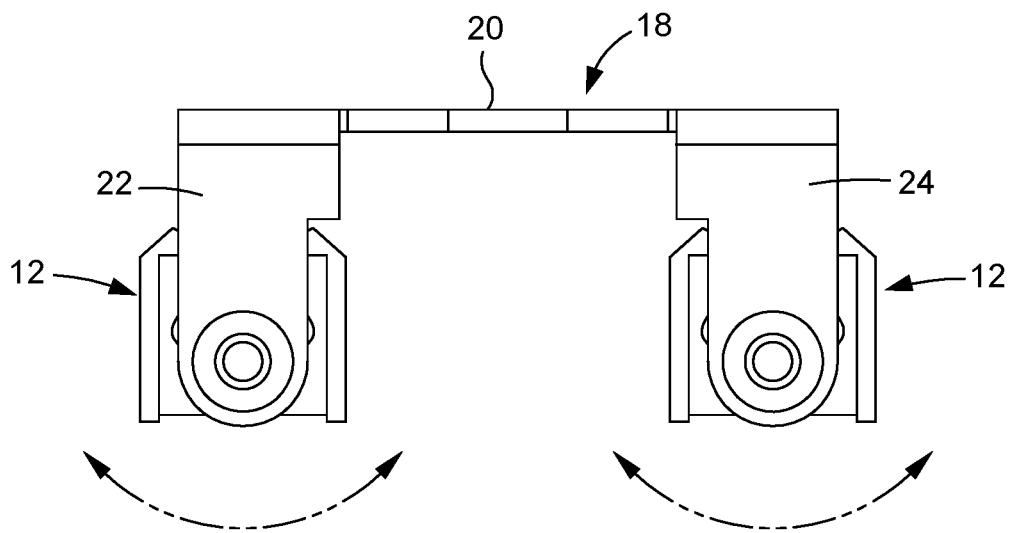
FIG. 5 is a side view of the base and pair of light housings of FIG. 4.

Referring now to FIG. 1, there is depicted an exemplary embodiment of a lighting device 10 attached to a ceiling for illuminating on object, such as a piece of art attached to a wall. The lighting device 10 includes a pair of light housings 12 capable of generating light beams that collectively define an illuminated area at the piece of art. The pair of light housings 12 are independently adjustable relative to each other to achieve a desired height of an illuminated area, as well as a desired position of the illuminated area, e.g., a desired vertical position of the illuminated area. A baffle 14 may also be included on the lighting device 10 to allow for further adjustment of the height of the illuminated area by blocking some of the light emitted by one or both of the housings 12. The lighting device 10 additionally includes a pair of beam modifying devices 16 attachable to the light housings 12, with the beam modifying devices 16 being adapted to configure the light beams to achieve a desired beam width, which in turn allows one to achieve a desired width of the illuminated area. Thus, the lighting device 10 may facilitate three modes of adjustment of the light emitted thereby: 1. Adjustment via pivoting of the light housings 12; 2. Adjustment via placement of the baffle 14; and 3. Adjustment via selective use of the beam modifying devices 16. As such, a user may be able to fine-tune the size and location of the illuminated area so that it closely conforms to the size and position of the desired object that is to be illuminated.

According to one embodiment, the lighting device 10 includes a base 18 adapted to be attached to the ceiling (e.g., a base support structure). The base 18 may include a primary base wall 20, a first pair of flanges 22 and a second pair of flanges 24. The first pair of flanges 22 are configured to attach to a first light housing 12, and the second pair of flanges 24 are configured to attach to a second light housing 12. The first pair of flanges 22 may extend generally perpendicularly from the primary base wall 20, and each include a bore sized to receive a mechanical fastener attachable to the first light housing 12 to facilitate pivotal engagement between the first light housing 12 and the first pair of flanges 22 about a first pivot axis 26 passing through the bores on the first pair of flanges 22. The mechanical fastener may be rivet, screw, nail, or the like.

The second pair of flanges 24 may extend generally perpendicularly from the primary base wall 20, and each include a bore sized to receive a mechanical fastener attachable to the second light housing 12 to facilitate pivotal engagement between the second light housing 12 and the second pair of flanges 24 about a second pivot axis 28 passing through the bores on the second pair of flanges 24.

The light housings 12 may be independently pivotal anywhere from 10-180 degrees, and in one particular embodiment, the light housings 12 may be configured to pivot approximately 90 degrees.

Although the exemplary embodiment includes two pairs of flanges 22, 24 and two pairs of light housings 12, it is contemplated that other embodiments may include only one pair of flanges with one light housing 12, or alternatively, three or more pairs of flanges that accommodate three or more corresponding light housings 12. Furthermore, although the base 18 is shown as being attached to the ceiling, it is contemplated that the base 18 may be attached to other base support structures, such as an opposing wall, a track, a pitched surface, or other adjacent surfaces near an item that is to be illuminated.

The base 18 may be formed of metal or other materials known in the art. Furthermore, the base 18 may be a single structure, with the flanges 22, 24 being integral with the base support wall 20. However, other structural configurations (e.g., the flanges 22, 24 being separately attached to the base support wall 20) may be employed without departing from the spirit and scope of the present disclosure.

Each light housing 12 is configured to be engageable with a light source 30, such as a light emitting diode(s) (LED), light bulb, or other light source known in the art. Each exemplary light housing 12 includes a pair of sidewalls 32, a pair of end walls 34, and a rear wall 36 which collectively define a cavity sized to include a plurality of light sockets or light connections, as well as any secondary optics included in the lighting device 10. In the embodiment depicted in FIG. 1, each light housing 12 is sized to accommodate three LEDs 30. However, the scope of the present disclosure is not limited to any number of LEDs 30. In this regard, the light housing 12 may be sized to accommodate as few as one LED 30 or an array of more than three LEDs 30.

It is contemplated that the light source 30 may be in optical alignment with one or more optical elements which may modify or otherwise conform the light beam generated by the light source 30. For instance, a total internal reflection (TIR) lens may be coupled to the light housing 12 and positioned in optical alignment with the light source 30 to collimate the light generated by the light source 30 to a desired degree. Furthermore, a diffuser film may also be coupled to the light housing 12 to achieve a desired modification to the light. The diffuser film may be placed adjacent a TIR lens such that light generated by the light source 30 may pass through both the TIR lens and the diffuser film.

A cover 38 may extend at least partially extend over the LEDs 30 and may include individual openings to accommodate light passage therethrough. The cover 38 may be configured to protect the light source 30 located within the light housing 12. In the exemplary embodiment, the cover 38 includes three openings, with each opening being aligned with a corresponding light element, such that each opening is centered about the same axis as a corresponding LED 30.

The light housing 12 may additionally include one or more beam modifying device connections 40 integrated therein configured to facilitate detachable connection with a beam modifying device 16, the purpose of which will be described in more detail below. The beam modifying device connections 40 may be magnets, push button locks, or other mechanical elements known in the art. In the exemplary embodiment, the light housing 12 includes a pair of magnets, with each magnet being coupled to a respective end wall 34, with the magnet having an exposed surface that is substantially flush or coplanar with an exposed surface of the end wall 34.

The light housings 12 may be formed of metal or other materials known in the art capable of providing the structural support required to facilitate the functionality described herein, e.g., pivoting relative to the base 18, while also being capable of withstanding temperatures associated with long periods of light actuation.

The lighting device 10 further includes the baffle 14, which is pivotally coupled to the housing 12. The baffle 14 may include a blocking plate 42 and a connection bracket 44 coupled to the blocking plate 42. The connection bracket 44 may include a main body 46 and a pair of bracket arms 48 on opposite sides of the main body 46. The bracket arms 48 may be pivotally coupled to the base 18 via an intervening connecting pin or fastener. The blocking plate 42 is coupled to the connection bracket 44 at the main body 46, such as via rivets, other mechanical fasteners, welding, adhesives, or the like. The blocking plate 42 may be formed of metal or other materials capable of blocking the passage of light therethrough, and also capable of withstanding any thermal energy associated with the light beam(s) emitted by the lighting device 10.

The baffle 14 may be pivotable relative to the base 18 between a blocking position and a stowed position. In the blocking position, the baffle 14 blocks light emitted by the light housing(s) 12. In the stowed position, the baffle 14 does not block any light emitted by the light housings 12. As the baffle 14 transitions from the blocking position toward the stowed position, the amount of light blocked by the baffle 14 decreases. Conversely, as the baffle 14 transitions from the stowed position toward the blocking position, the amount of light blocked by the baffle 14 increases. The baffle 14 may be configured to stay in a desired position, either at the stowed position, the blocking position, or any position therebetween. The ability to stay in a desired position may be facilitated through friction forces between the baffle 14 and the flanges on the base 18, or between the baffle 14 and the light housing 12, or a combination thereof. Other modalities known in the art for maintaining the baffle 14 in the desired position may also be used without departing from the spirit and scope of the present disclosure.

Figure 6:
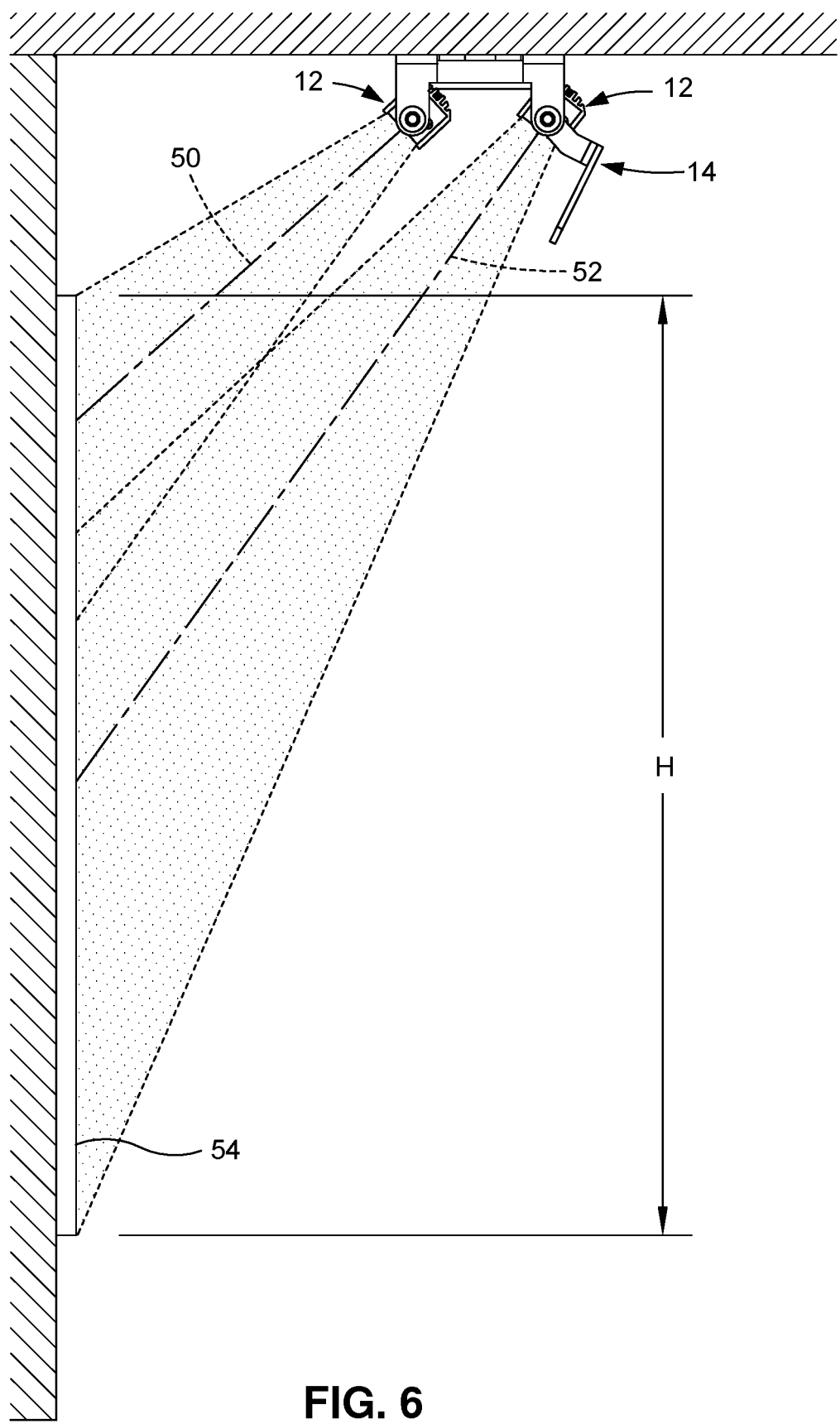
FIG. 6 is a side view of a pair of light beams being emitted by the pair of light housings to collectively define a height of an illuminated area.
Figure 7:
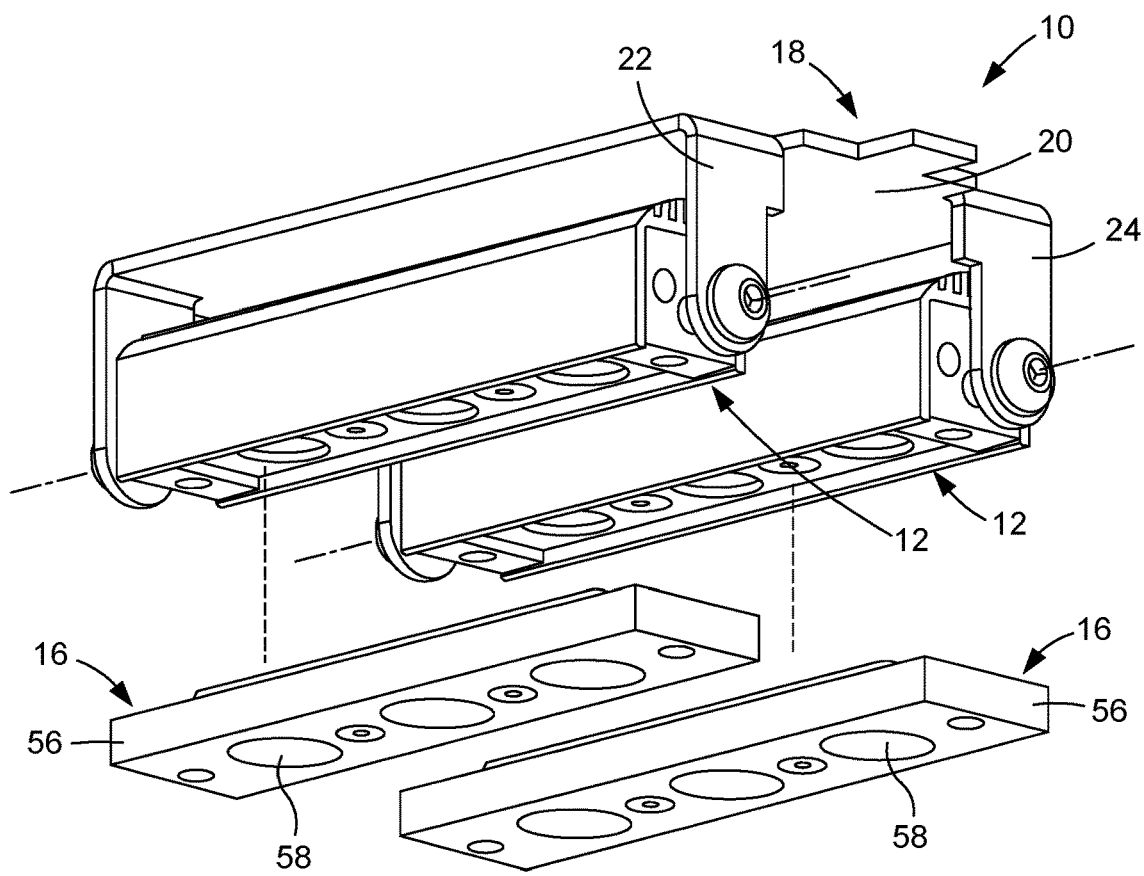
FIG. 7 is a lower perspective view of a pair of beam modifying devices detached from the pair of light housings.
Figure 8:
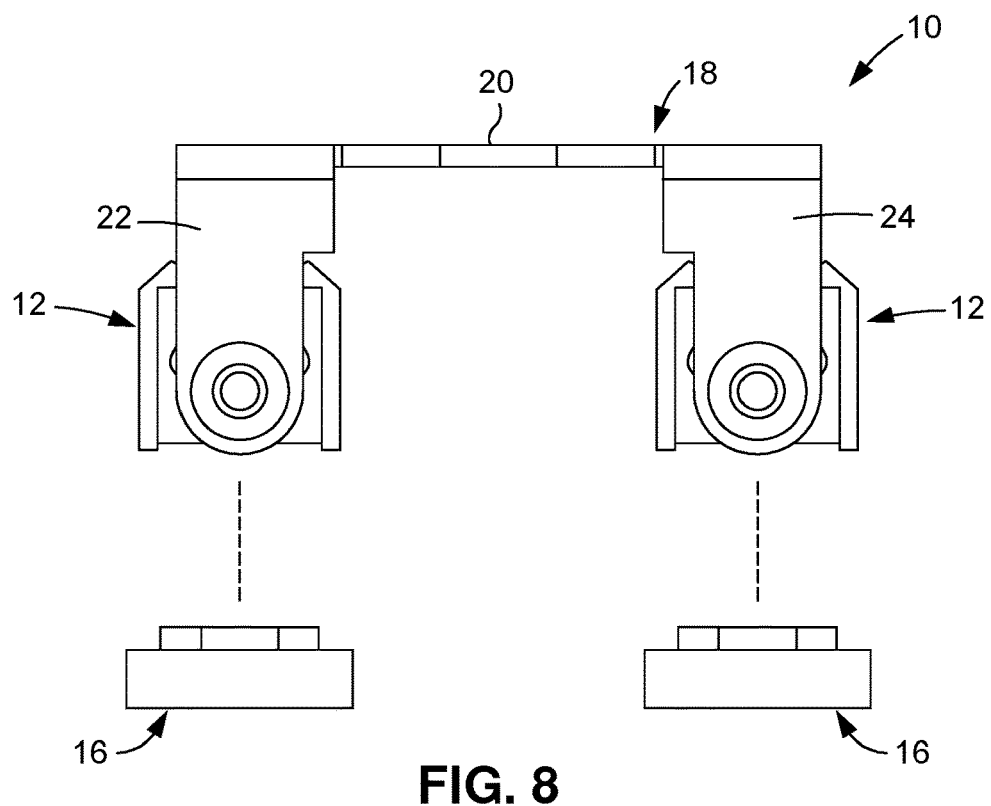
FIG. 8 is a side view of the pair of beam modifying devices detached from the pair of light housings.

Referring now to FIG. 6, each light housing 12 is configured to direct light along a respective illumination axis when a light source is engaged with the light housing 12 and the light housing 12 is actuated. In the exemplary view depicted in FIG. 6, light is emitted from a first light housing 12 along a first illumination axis 50 and from a second light housing 12 along a second illumination axis 52. The light from the first and second light housings 12 collectively define an illumination area on a target surface 52, which in the example depicted in FIG. 6, is a piece of art. The first light housing 12 is pivotable relative to the base 18 about the first pivot axis 26 and the second light housing 12 is pivotable relative to the base 18 about the second pivot axis 28 spaced from the first pivot axis 26. In more detail, from the perspective depicted in FIG. 6, the first light housing 12 may pivot upwardly (in a first rotational direction) to increase a vertical angle from Nadir relative to the first illumination axis 50 (e.g., to increase a magnitude of an angle between a vertical axis and the first illumination axis 50). This has the effect of moving a corresponding upper edge of the illumination area in an upward direction. Conversely, the first light housing 12 may pivot downwardly (in a second rotational direction) to decrease the vertical angle from Nadir relative to the first illumination axis 50 (e.g., to decrease the magnitude of an angle between a vertical axis and the first illumination axis 50). This has the effect of moving a corresponding upper edge of the illumination area in a downward direction. Similarly, the second light housing 12 may pivot upwardly to increase a vertical angle from Nadir relative to the second illumination axis 52 (e.g., to increase a magnitude of an angle between a vertical axis and the second illumination axis 52). This has the effect of moving a corresponding lower edge of the illumination area in an upward direction. The second light housing 12 may also pivot downwardly to decrease the vertical angle from Nadir relative to the second illumination axis 52 (e.g., to decrease the magnitude of an angle between a vertical axis and the second illumination axis 52). This has the effect of moving the corresponding lower edge of the illumination area in a downward direction. The size of the illumination area may be increased by pivoting the first light housing 12 (and the first illumination axis 50) upwardly, and the second light housing 12 (and the second illumination axis 52) downwardly. Conversely, the size of the illumination area may be decreased by pivoting the first light housing 12 (and the first illumination axis 50) downwardly, and the second light housing 12 (and the second illumination axes 52) upwardly. The position of the illumination area may be adjusted without adjusting the size of the illumination area by pivoting the first and second light housings 12 in concert with each other, e.g., in the same rotational direction. Thus, the position or angle of the first and second illumination axes 50, 52 may be independently adjusted to change the position and size of the illumination area, and more specifically, the height H of the illumination area.

The baffle 14 may also be used to adjust the height H of the illumination area by blocking some of the emitted light, as described in more detail above. As shown in FIG. 6, the baffle 14 is in the stowed configuration, so as not to block any light. As the baffle 14 may adjust the height H of the illumination area along a baffle adjust axis, which may be parallel to the height H. In this regard, as more light is blocked, the height H becomes smaller, and as less light is blocked, the height H becomes larger.

Referring now to FIGS. 7-10, the lighting device 10 may be configured to not only allow for adjustment of the height H of the illumination area, the lighting device 10 may also be configured to allow for selective adjustment of the width of the illumination area, with the width referring to a dimensional distance perpendicular to the height H. In this regard, as light is emitted from each light housing 12, the light may spread in a direction perpendicular to the corresponding illumination axis, e.g., along a width axis, two define a beam width, W, which at least partially defines the illumination area.

To facilitate the adjustment of the beam width, W, one embodiment of the lighting device 10 may include beam modifying devices 16 that may be detachably engageable with the light housing 12 to achieve a desired beam width or beam angle of light emitted from the light housing 12. Each beam modifying device 16 may include a device housing 56 and one or more beam optics bodies 58 coupled to the device housing 56. The beam optics body 58 may include a lens, a film or other light beam modifying element known in the art. Each beam optics body 58 may be configured to achieve a desired angle of the light that passes through the beam optics body 58. The angle of the light may refer to the change in the direction of the light caused by the beam optics body 58 in response to passage of the light through the beam optics body 58. Thus, a first beam modifying device 16 may be adapted to achieve a first angle of light spread, while a second beam modifying device 16 may be adapted to achieve a second angle of light spread. By interchanging the first and second beam modifying devices 16, a user can selectively adjust the angle at which the light departs from the lighting device 10.

While the foregoing describes the use of the beam modifying devices 16 to modify a beam width W, it is understood that, in a broad sense, the beam modifying devices 16 may be used to increase or decrease the spread of light along any defined axis (e.g., not limited to width). Thus, while one embodiment of the beam modifying devices 16 may be configured to adjust the spread of light along a defined axis corresponding to the width of the illuminated area, it is understood that the scope of the present disclosure is not limited thereto. In this regard, other embodiments of the beam modifying devices 16 may be configured to adjust the spread of light along a defined axis corresponding to the height of the illuminated area. In yet other embodiments, the beam modifying devices 16 may be configured to adjust the spread of light along a defined axis that does not correspond to either the height or the width of the illuminated area; rather, the spread of light may be along a diagonal axis.

Each beam modifying device 16 may also include a connector 60 adapted for cooperative engagement with a corresponding connector 40 on the light housing 12. As noted above, the connector 60 may include a magnet, push button locks, or the like. When the beam modifying device 16 is attached to the light housing 12 via engagement between the connectors 40, 60, the beam modifying device 16 may be in optical alignment with the light source 30. Optical alignment may refer to the relative position of the beam optics bodies 50 and the individual light elements, such that light emitted from the light elements passes through a corresponding beam optics body 50. When optically aligned, the light elements and the corresponding beam optics body 50 may be disposed about, or reside along, a common axis.

Figure 9:
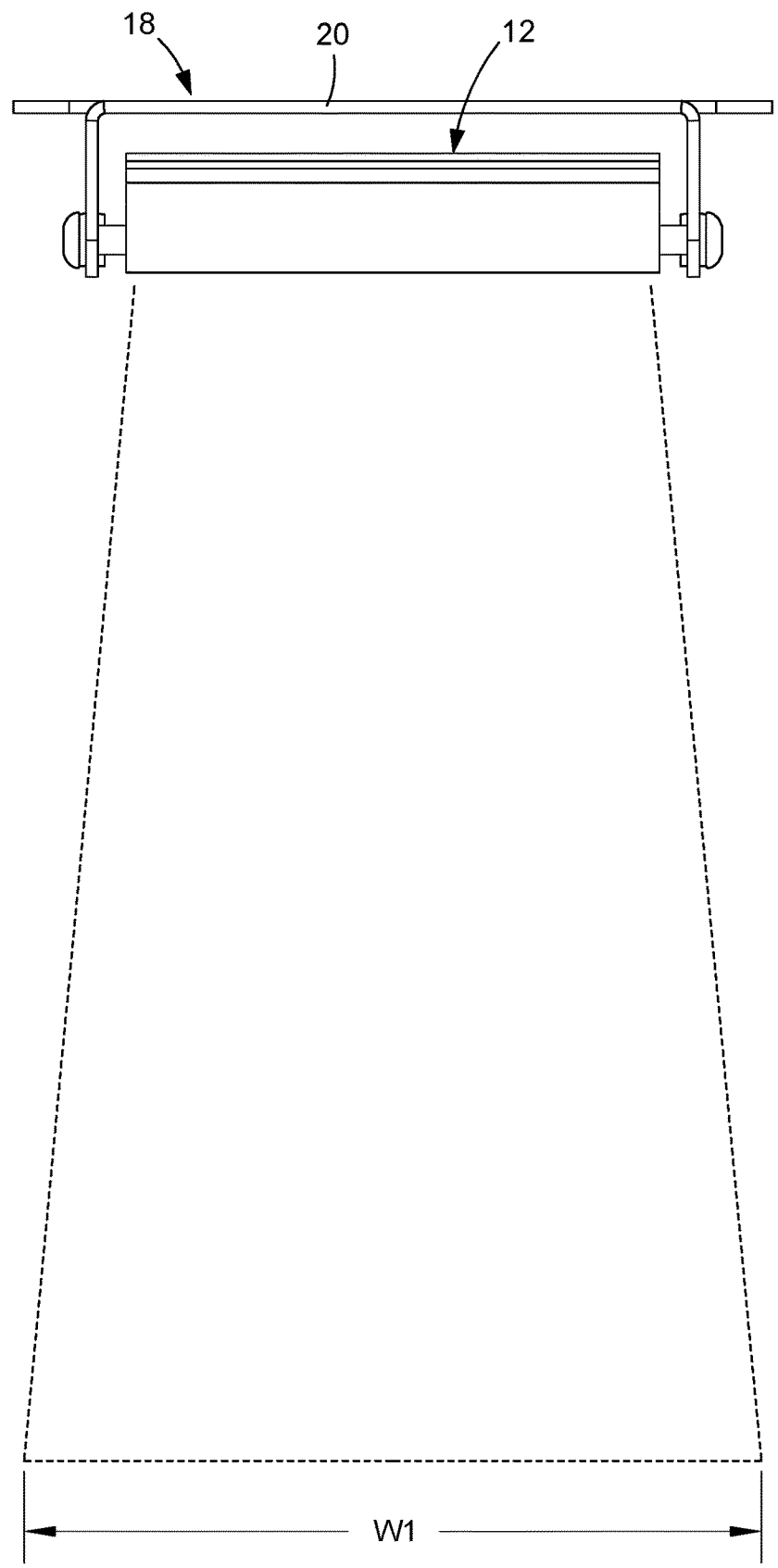
FIG. 9 is a front view of a light beam emanating from a light housing not having a beam modifying device coupled thereto, the light beam defining a first beam width.
Figure 10:
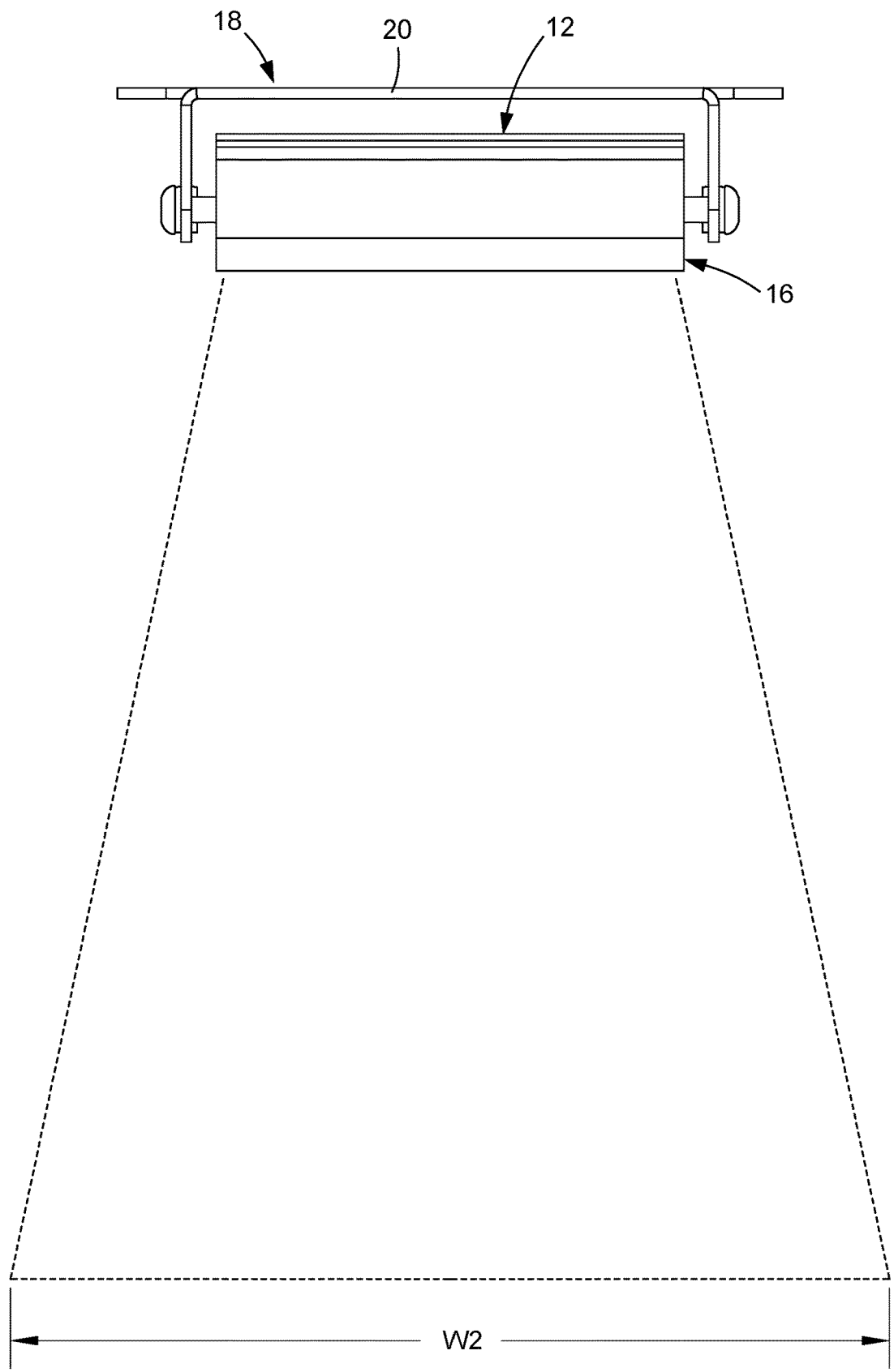
FIG. 10 is a front view of the light beam emanating from the light housing having a beam modifying device coupled thereto, the light beam defining a second beam width greater than the first beam width.

A comparison of FIGS. 9 and 10 illustrates how the beam modifying devices 16 may be used to modify the beam width. In more detail, the beam width W1 shown in FIG. 9 is associated with light emitted from the light housing 12 with no beam modifying device 16 attached thereto. On the other hand, a beam modifying device 16 has been attached to the light housing 12 in FIG. 10 to achieve a wider beam angle and an associated beam width, W2. Thus, attaching the beam modifying device 16 allows the light beam from the same light housing 12 to increase in width. Conversely, detaching the beam modifying device 16 from the light housing 12 would result in a decrease in the beam width. Therefore, the selective use of the beam modifying device 16 may facilitate size adjustment of the illumination area along a beam modifying axis that is perpendicular to the height H. The beam modifying axis may be perpendicular to the baffle adjust axis, as well as the axis along which the illumination axes 50, 52 are adjusted as a result of pivoting of the light housings 12.

It is contemplated that for lighting devices 10 having multiple light housings 12, different widths may be achieved through the use of different beam modifying devices 16. In this regard, a first beam modifying device 16 configured to define a first width may be connected to a first light housing 12, while a second beam modifying device 16 configured to define a second width may be connected to a second light housing 12. This may be particularly useful when trying to illuminate several pieces of art mounted to a single wall. For instance, a single piece of art may be mounted above a row of multiple pieces of art, which extend laterally beyond that of the upper piece of art. As such, a first beam modifying device 16 may be used to modify a light beam directed toward the single piece of art having a narrow width, while a second beam modifying device 16 may be used to create a wider light beam for illuminating the multiple pieces of art.

In addition to adjusting the size and position of the illumination area, the brightness of the illumination area may also be adjusted via a dial 62 or other adjuster integrated into the lighting device 10. In one embodiment, the brightness or intensity of light emitted from the first light housing 12 may be capable of being adjusted independent of the brightness or intensity of light emitted from the second light housing 12. Each dial 62 may be capable of adjusting the control signal (e.g., power) sent to the light source 30 in the corresponding light housing 12. The ability to independently adjust the brightness or intensity may allow the user to create a uniform light pattern across the entire illumination area. For instance, the top of the illumination area may be brighter due to its closer proximity to the lighting device 10 than the bottom of the illumination area, which may be dimmer due to it being farther from the lighting device 10. Thus, the light housing 12 generating light for the top of the illumination area may have its light dimmed, and/or the light housing generating light for the bottom of the illumination area may have its light brightened to achieve a uniform brightness and intensity across the entire illumination area.

In addition to having individual adjustments for each light housing 12, it is also contemplated that the lighting device 10 may include a global adjuster, capable of simultaneously making the same adjustment to each light housing 12. In this regard, the global adjuster may facilitate simultaneous dimming or brightening of the light from all light housings 12 by the same magnitude. The global adjuster may be in electrical communication with the light elements in each light housing 12 to adjust the control signals (e.g., power) sent to the light elements. The global adjuster may be a slide switch, dial, or other adjusters known in the art.

With the basic structure of the lighting device 10 having been described above, the following discussion pertains to an exemplary use of the lighting device 10. With the lighting device 10 mounted on a base support surface (e.g., a ceiling) in proximity to a target object 54, the light source 30 is actuated to generate an illuminated area on or near the target object. The lighting device 10 may then be adjusted to conform the size and position of the illuminated area to conform to that of the target object 54. The height H of the illumination area may be adjusted to conform to the height of the target object 54. In this regard, the first light housing 12 may be pivoted relative to the base 18 to bring the top of the illumination area in alignment with the top of the target object 54. Furthermore, the second light housing 12 may be pivoted relative to the base 18 to bring the bottom of the illumination area in alignment with the bottom of the target object 54. If the light generated by the first and/or second light housings 12 extends below the bottom of the target object 54 and the first and/or second light housings 12 cannot pivot in a direction which raises the bottom of the illumination area, the baffle 14 may be used to block a portion of the light to conform the bottom of the illumination area to the bottom of the target object.

The width of the illumination area may also be adjusted by either connecting or disconnecting beam modifying devices 16 to the light housings 12 to conform the width of the illumination area to the width of the target object. The beam modifying device 16 that most closely achieves the desired width may be determined via trial-and-error. In this regard, one beam modifying device 16 may be placed on a light housing 12, and if further adjustment is desired, the beam modifying device 16 may be replaced with a new beam modifying device 16 until the desired width is achieved.

Figure 11:
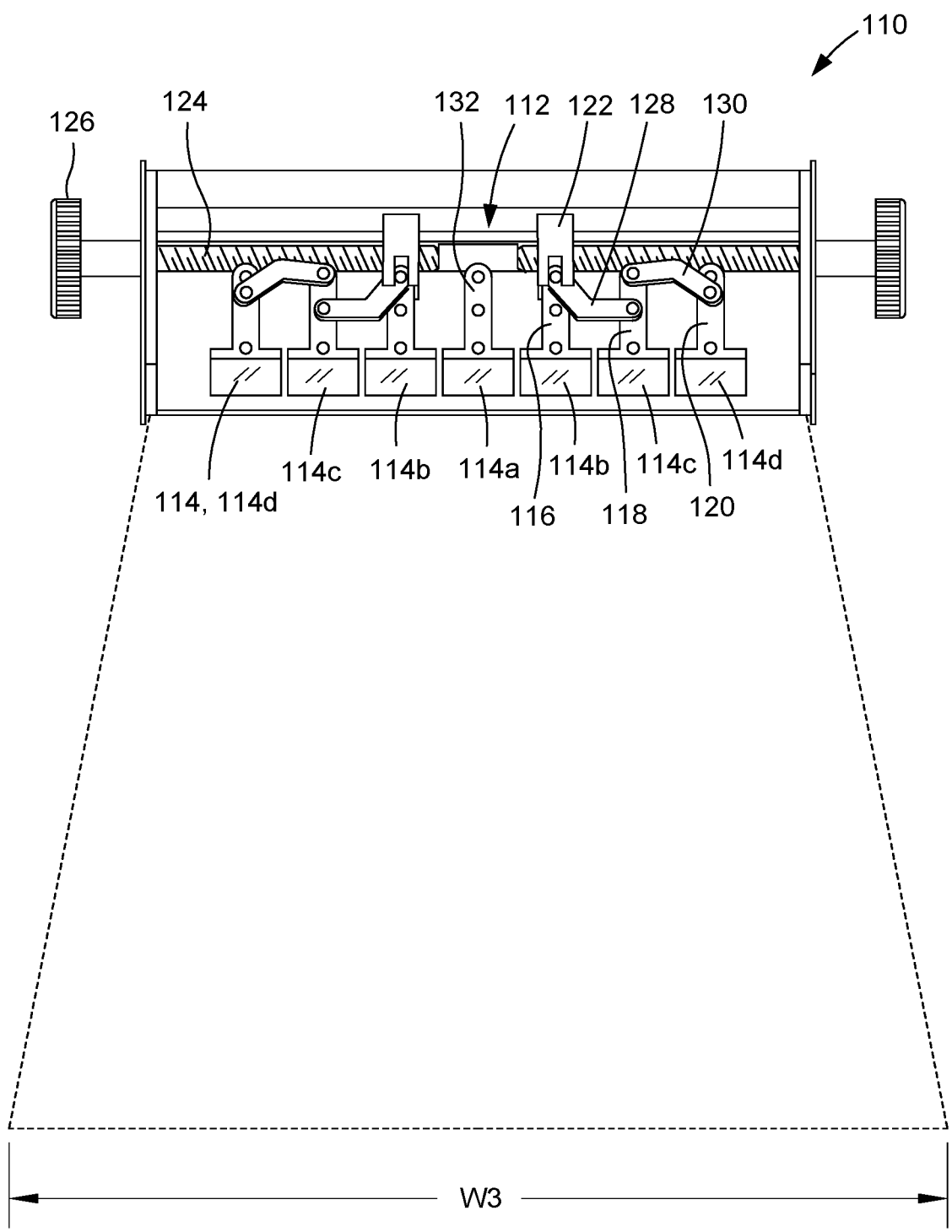
FIG. 11 is a side, partial cutaway view of a second embodiment of a light housing having internal beam spreading levers incorporated therein, the beam spreading levers being depicted in a narrow configuration.
Figure 12:
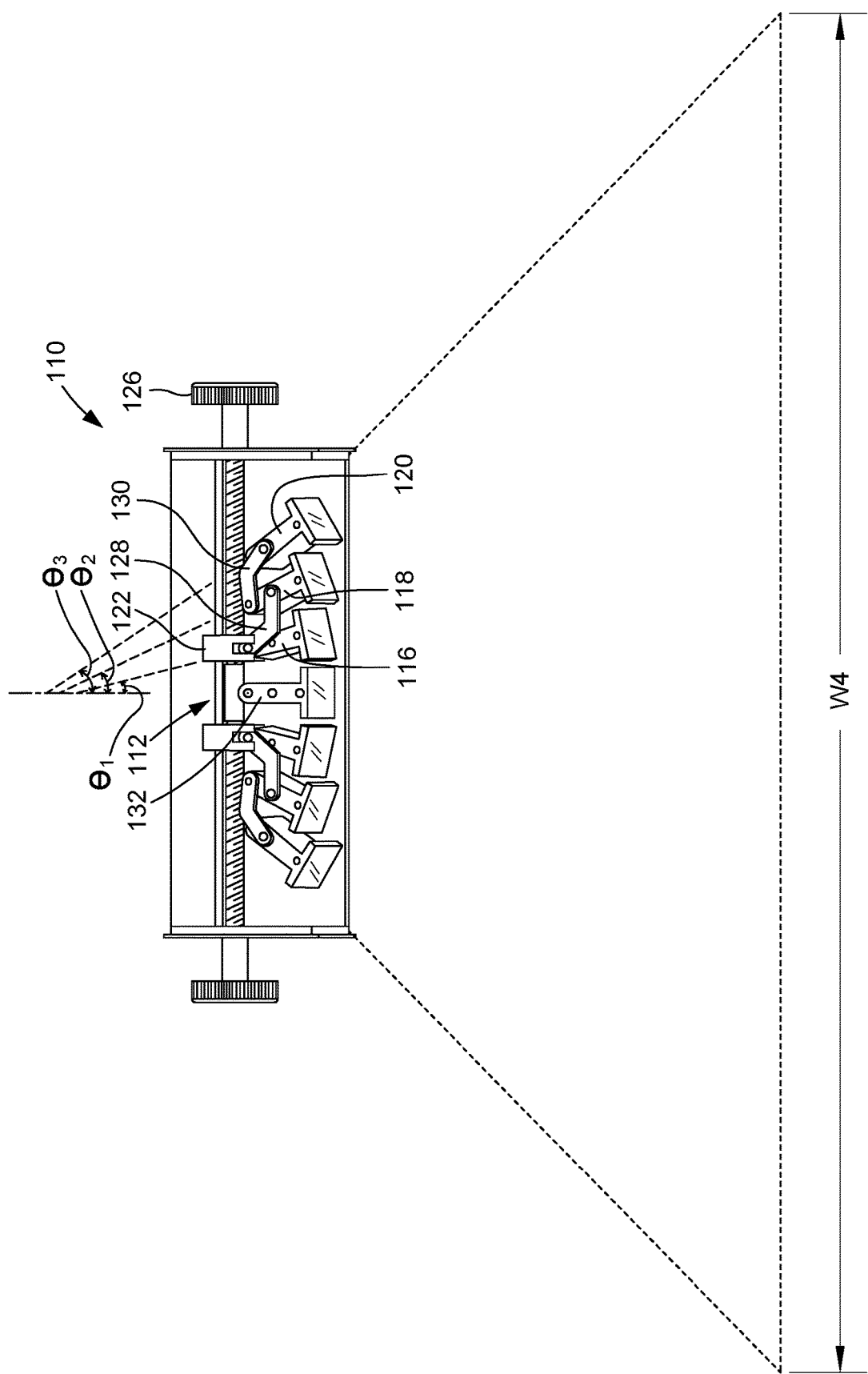
FIG. 12 is a side, partial cutaway view of the second embodiment of the light housing, with the beam spreaders being shown in a wide configuration.

Referring now to FIGS. 11 and 12, there is depicted a second embodiment of the lighting device 110 having an internal, mechanical light spread controller 112. In this regard, while the first embodiment used beam modifying devices 16 to achieve optical spreading of the light beams, the lighting device 110 of FIGS. 11 and 12 achieves beam spreading through a mechanical modality which physically moves the position and direction of the individual light elements 114.

In more detail, the lighting device 110 includes a light source comprised of a plurality of independent light elements 114, including a center light element 114*a*, a pair of first lateral light elements 114*b*, a pair of second lateral light elements 114*c*, and a pair of third lateral light elements 114*d*. The pairs of lateral light elements are on opposite sides of the center light element 114*a*, with the first lateral light elements 114*b* being closest to the center light element 114*a*, and the second lateral light element 114*c* being between the first and third lateral light elements 114*b*, 114*d*. Each light element 114 is attached to a respective linkage, with the first lateral light elements 114*b* being attached to first linkages 116, the second lateral light elements 114*c* being attached to second linkages 118, and the third lateral light element 114*d* being attached to third linkages 120. The first linkages 116 are also attached to a respective carriage 122, which is moveably coupled to an axle 124 in a manner such that rotation of the axle 124 causes translation of the carriage 122 along the axle 124. The axle 124 may be coupled to a dial 126 which may facilitate manual rotation of the axle 124. A first pivot link 128 interconnects a first linkage 116 and a second linkage 118, and a second pivot link 130 interconnects a second linkage 118 and a third linkage 120.

The light spread controller 112 may refer to the linkages 116-120, links 128-130, carriages 122 and axle 124. Furthermore, the light spread controller 112 may be configured to transition between a narrow configuration and wide configuration, with the size of the illuminated area increasing as the light spread controller 112 transitions from the narrow configuration toward the wide configuration. FIG. 11 shows the light spread controller 112 in the narrow configuration to achieve a width W3 of the illumination area, while FIG. 12 shows the light spread controller 112 in the wide configuration to achieve a width W4 of the illumination area, with W4 being wider than W3.

When the light spread controller 112 is in the narrow configuration, the individual light elements 114 may be aligned in a row along a common axis with each light element 114 being pointed in the same direction. When the light spread controller 112 is in the wide configuration, the individual light elements 114 may assume a generally curved or actuate configuration, with the light elements 114b-d on one side of the center light element 114a being angled toward one direction, while the light elements 114b-d on the other side of the center light element 114a are angled toward an opposite direction.

To transition from the narrow configuration to the wide configuration, the axle 124 is rotated in a first rotational direction which causes the carriages 122 to be drawn toward each other, e.g., toward the center linkage 132. Such movement of the carriages 122 causes the first, second and third linkages 116-120 to assume a slightly arcuate configuration, via the intervening first and second pivot links 128, 130 to achieve the desired beam spread angle. The arcuate configuration may be achievable by rotating the first, second, and third linkages 116-120 at different rotational speeds. The first linkage 116 may be rotated at a first rotational speed, the second linkage 118 may be rotated at a second rotational speed greater than the first rotational speed, and the third linkage 120 may be rotated at a third rotational speed greater than the second rotational speed. Thus, over the same period of time, the first linkage 116 may rotate across a first angle $\Theta1$, while the second linkage 118 may rotate across a second angle Q2, and the third linkage 120 may rotate across a third angle $\Theta3$, with the second angle $\Theta2$ being greater than the first angle 1, and the third angle $\Theta3$ being greater than the second angle $\Theta2$.

The use of the light spread controller 112 may allow for selective, incremental adjustment (e.g., continuous adjustment) of the beam width through rotation of the axle 124, with rotation of the axle 124 in one direction causing incremental widening of the light beam, and rotation of the axle 124 in an opposite direction causing incremental narrowing of the light beam.

Although the foregoing describes an exemplary use of the lighting devices for illuminating a piece of art, it is contemplated that the use of the lighting device may not be limited thereto. For instance, the lighting device may be used for theatrical purposes, medical purposes, business purposes, etc.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A lighting device comprising:
   a base configured to be attachable to a base support structure;
   a first light housing coupled to the base and configured to be engageable with a first light source to illuminate a first light beam along a first illumination axis when the first light source is engaged with the first light housing and the first light source is actuated, the first light housing being moveable relative to the base;
   a first beam modifying device being selectively attachable to the first light housing in optical alignment with the first light source;
   a baffle coupled to the base, the baffle being selectively pivotable relative to the first light housing to selectively block a desired amount of the first light beam from passing beyond the baffle;
   the first light housing being configured such that movement of the first light housing relative to the base facilitates adjustment of a position of an illuminated area defined, at least in part, by the first light beam;
   the first beam modifying device being configured such that attachment of the first beam modifying device to the first light housing facilitates adjustment of a size of the illuminated area.

2. The lighting device recited in claim 1, wherein the first beam modifying device is configured to facilitate adjustment of the size of the illuminated area along a beam modifying axis perpendicular to the first illumination axis the baffle being configured to facilitate adjustment of the size of the illuminated area along a baffle adjust axis different from the beam modifying axis.

3. The lighting device recited in claim 2, wherein the baffle adjust axis is perpendicular to the beam modifying axis.

4. The lighting device recited in claim 1, wherein the first light housing is pivotally coupled to the base.

5. The lighting device recited in claim 4, wherein the first light housing and the baffle are both pivotable relative to the base about a common axis.

6. The lighting device recited in claim 5, wherein the common axis extends longitudinally through the first light housing.

7. The lighting device recited in claim 1, wherein the first light housing is configured to being engageable with multiple light elements defining the first light source.

8. The lighting device recited in claim 7, wherein the first beam modifying device includes multiple beam modifying elements, each beam modifying element being optically alignable with a respective one of the multiple light elements when the multiple light elements are engaged with the first light housing and the first beam modifying device is attached to the first light housing.

9. The lighting device recited in claim 1, further comprising a second light housing coupled to the base in spaced relation to the first light housing, the second light housing being configured to be engageable with a second light source to illuminate a second light beam along a second illumination axis when the second light source is engaged with the second light housing and the second light source is actuated, the second light housing being moveable relative to the base.

10. The lighting device recited in claim 9, further comprising a second beam modifying device being selectively attachable to the second light housing in optical alignment with the second light source, the second beam modifying device being configured such that attachment of the second beam modifying device to the second light housing facilitates adjustment of the size of the illuminated area.

11. The lighting device recited in claim 1, further comprising a brightness adjuster in operative communication with the light housing and adapted to facilitate selective adjustment of a brightness of the light beam.

12. A lighting device comprising:
a base configured to be attachable to a base support structure;
a light housing coupled to the base and configured to be engageable with a light source to illuminate a light beam along an illumination axis when the light source is engaged with the light housing and the light source is actuated, the light housing being moveable relative to the base, the light housing being configured such that movement of the light housing relative to the base facilitates adjustment of the position of an illuminated area defined, at least in part, by the light beam;
a beam modifying device coupled to the light housing and configured to be operatively alignable with the light source, the beam modifying device being configured to facilitate adjustment of the size of the illuminated area; and
a baffle coupled to the base, the baffle being selectively pivotable relative to the light housing to selectively block a desired amount of the light beam from passing beyond the baffle.

13. The lighting device recited in claim 12, wherein the beam modifying device comprises a light spread controller including a plurality of interconnected linkages operatively connected to transition between a narrow configuration and wide configuration, the size of the illuminated area increasing as the light spread controller transitions from the narrow configuration toward the wide configuration.

14. The lighting device recited in claim 12, wherein the beam modifying device comprises a light spread controller configured to facilitate adjustment of the size of the illuminated area along a controller adjust axis, the baffle being configured to facilitate adjustment of the size of the illuminated area along a baffle adjust axis different from the controller adjust axis.

15. The lighting device recited in claim 14, wherein the controller adjust axis is perpendicular to the baffle adjust axis.

16. The lighting device recited in claim 12, wherein the light housing is pivotally coupled to the base.

17. The lighting device recited in claim 12, wherein the light housing is configured to being engageable with multiple light elements defining the light source.

18. A method of adjusting a size of an illuminated area, the method comprising the steps of:
adjusting a position of a light housing relative to a base to adjust an illumination axis along which a light beam emanates from the light housing, the light beam defining, at least in part, the illuminated area;
adjusting a beam width associated with the light beam emanating from the light housing to adjust the size of the illuminated area along a width axis; and
pivoting a baffle to the light housing to block at least a portion of the light beam emanating from the light housing to adjust the size of the illuminated area in a direction different from a direction associated with the width axis.

19. The method recited in claim 18, wherein the step of adjusting the position of the light housing includes pivoting the light hosing relative to the base.

20. The method recited in claim 18, wherein the step of adjusting the beam width includes attaching a beam modifying device to the light housing.

* * * * *